No. 804,986. PATENTED NOV. 21, 1905.
H. STAMM.
SELF LOADING FIREARM.
APPLICATION FILED JULY 21, 1902.
7 SHEETS—SHEET 3.
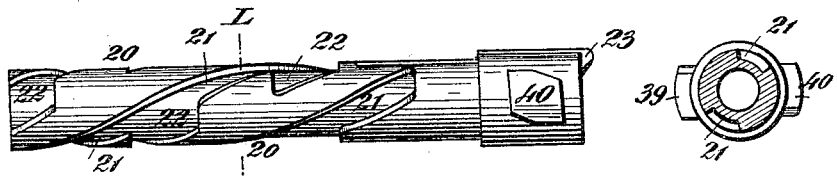
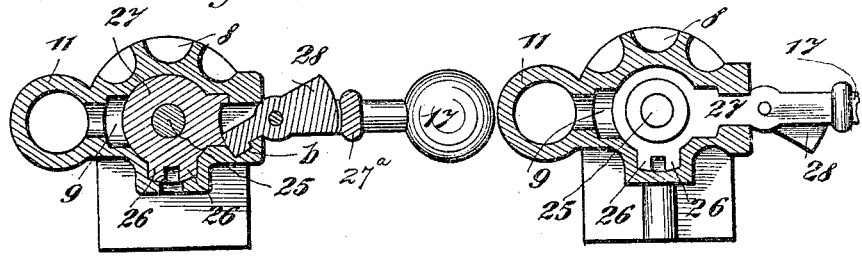
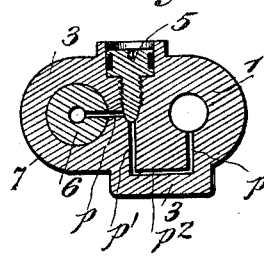
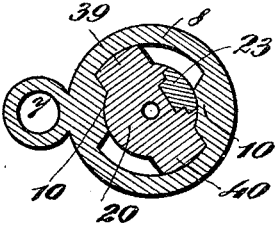
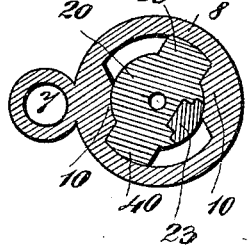
Witnesses:
Inventor:
Hans Stamm

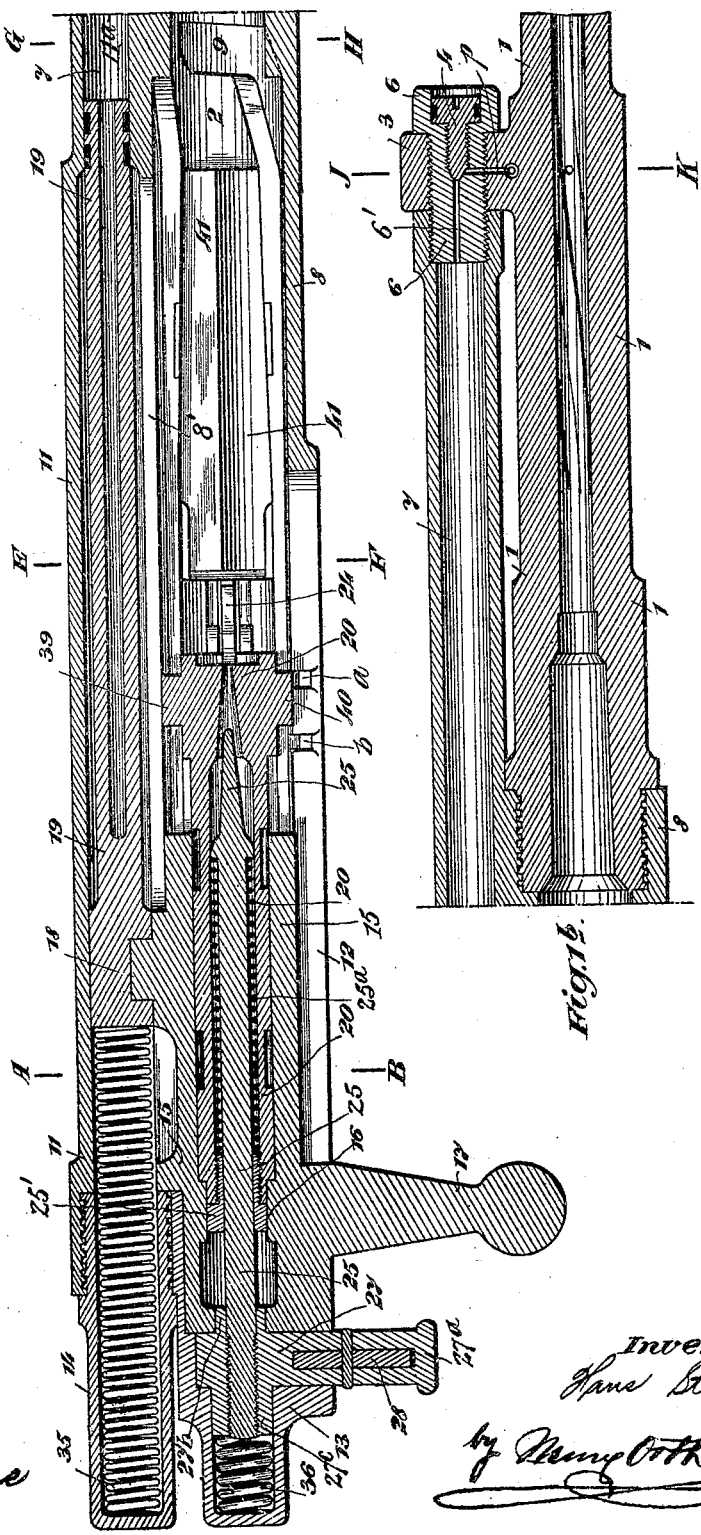

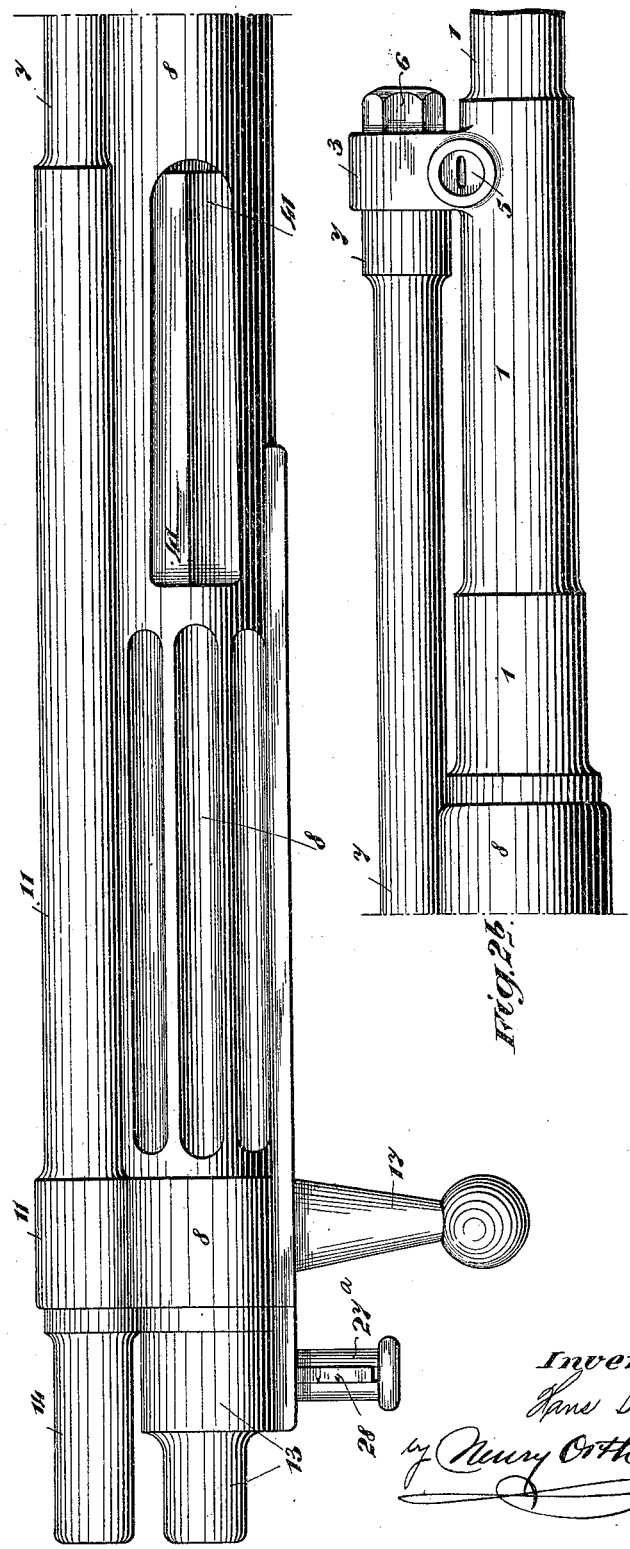

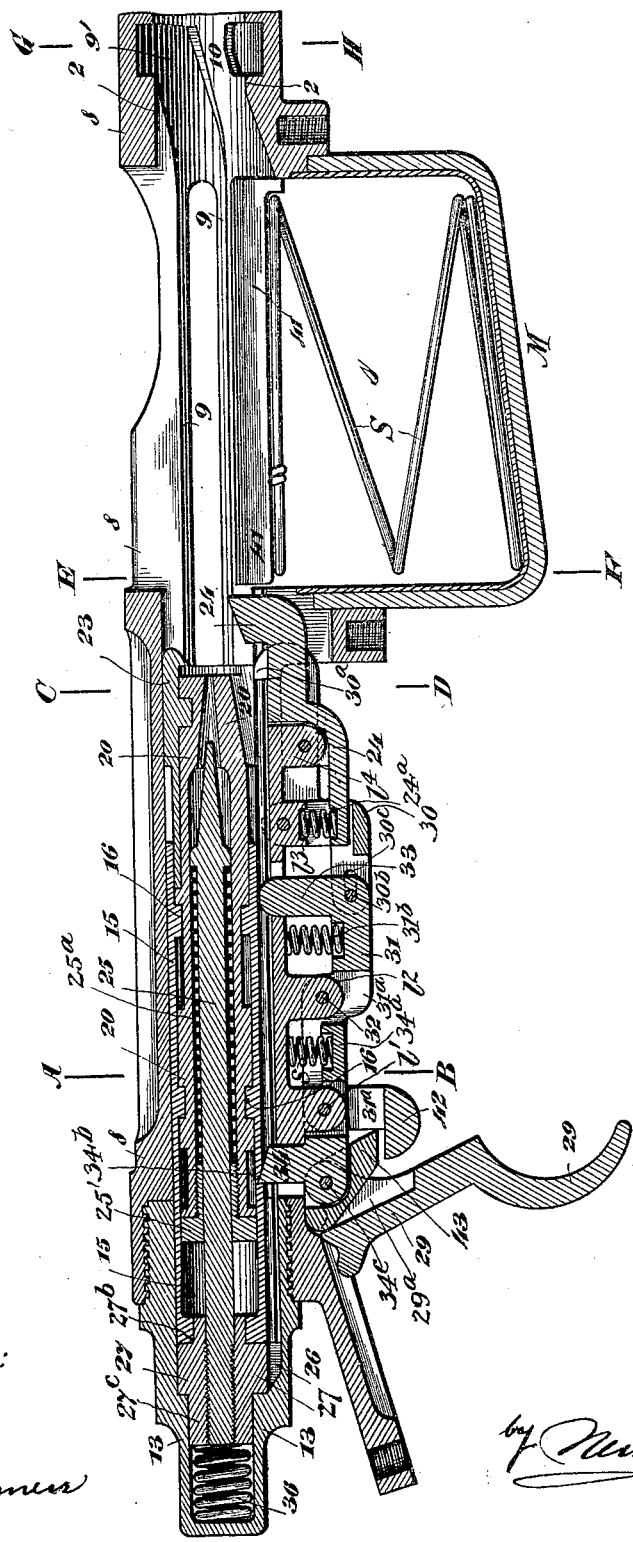

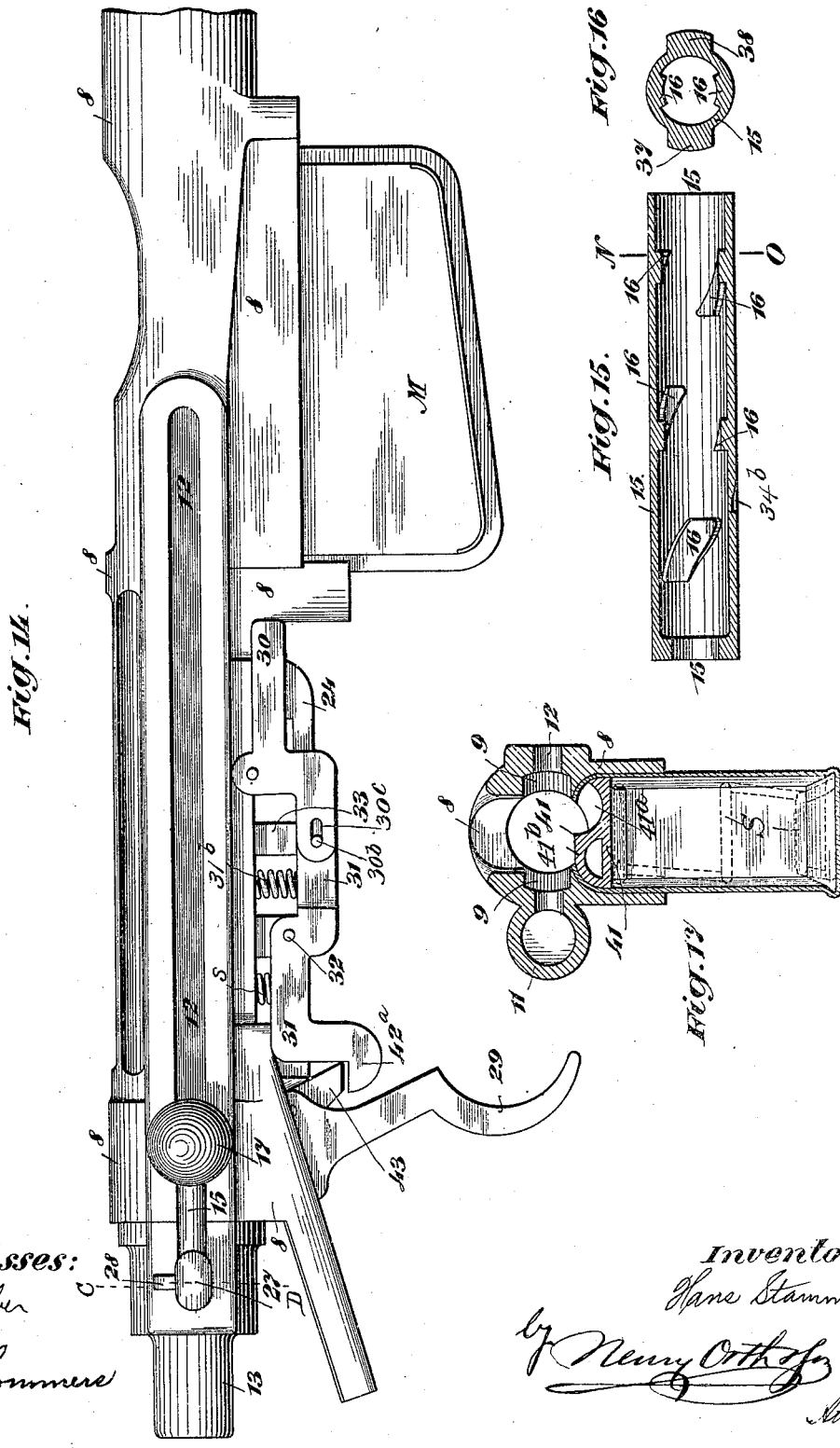

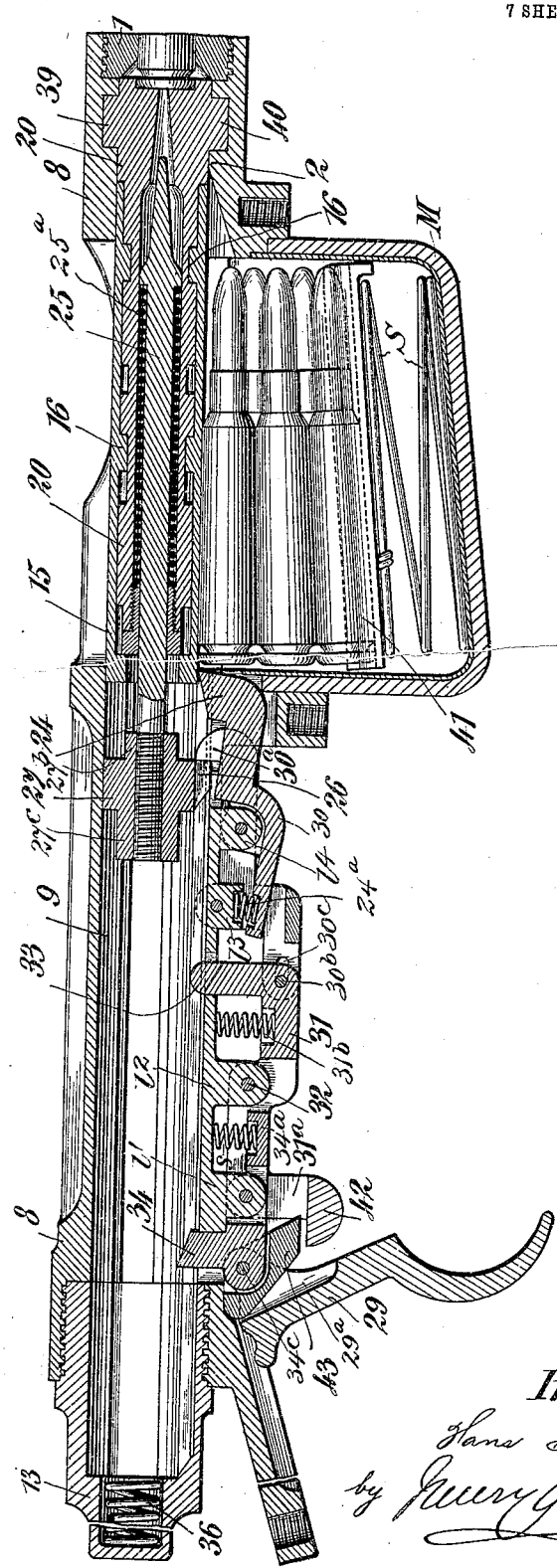

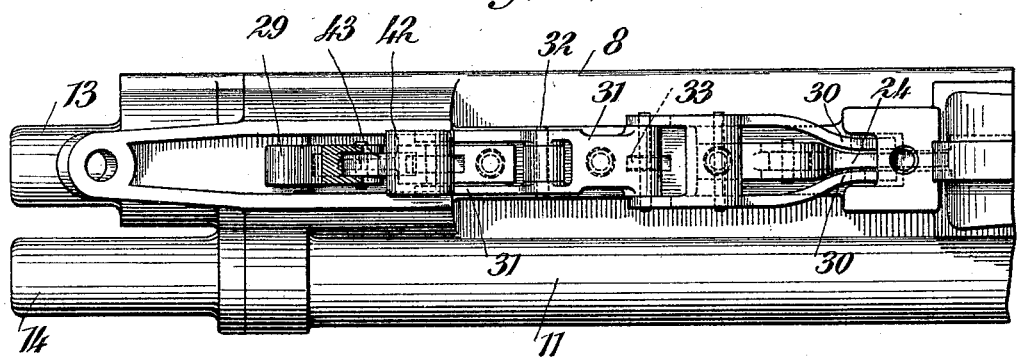
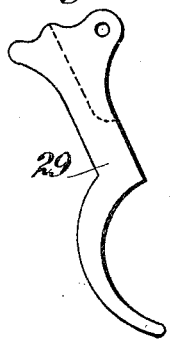
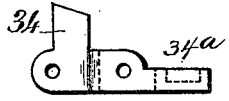
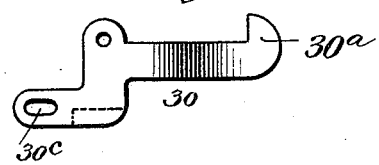
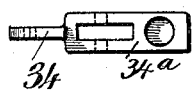
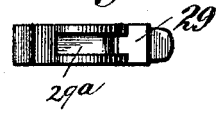
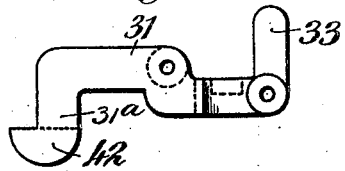
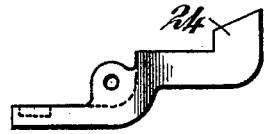

UNITED STATES PATENT OFFICE.

HANS STAMM, OF ST. GALL, SWITZERLAND.

SELF-LOADING FIREARM.

No. 804,986.          Specification of Letters Patent.          Patented Nov. 21, 1905.

Application filed July 21, 1902. Serial No. 116,472.

*To all whom it may concern:*

Be it known that I, HANS STAMM, a citizen of the Republic of Switzerland, residing at St. Gall, Switzerland, have invented new and useful Improvements in Self-Loading Firearms, of which the following is a specification.

My invention has relation to rapid-fire guns of that type known as "gas-actuated" guns; and it has for its object certain improvements in the construction of such guns.

A characteristic feature of my invention, irrespective of details of construction, lies in the construction of the receiver, and more particularly in the arrangement alongside thereof of a piston-housing and cylinder for the gas-actuated piston, in a positive connection of this piston with the breech-bolt carrier, and in means whereby said piston, together with the breech-bolt carrier, breech-bolt, and firing-pin, can be bodily removed through the rear end of the breech-casing.

A further characteristic feature lies in the integral construction of the receiver, piston-housing, and cylinder.

A further characteristic feature of my invention lies in the means or mechanism for locking the breech-bolt in firing position and for unlocking the same, either automatically or by hand, so that the gun may be loaded automatically or by hand.

A further characteristic feature of my invention lies in the firing mechanism and in the provision of a brake acting on the breech-bolt sleeve to slacken or arrest its forward movement under the action of the restoring-spring.

A further characteristic feature lies in the use of a tubular gas-actuated piston, open at its forward end for purposes hereinafter described; but that my invention may be fully understood I will describe the same in detail, reference being had to the accompanying drawings, in which—

Figures 1$^a$ and 1$^b$ are horizontal sections of so much of a gun as will be necessary to an understanding of my invention, Fig. 1$^b$ being a continuation of Fig. 1$^a$. Figs. 2$^a$ and 2$^b$ are plan views of Figs. 1$^a$ and 1$^b$, respectively. Fig. 3 is an elevation of the breech-bolt, and Fig. 4 is a section thereof on line L M of Fig. 3 looking from left to right. Fig. 5 is a section on line C D of Fig. 13, with the breech-bolt in its forward locked position. Fig. 6 is a section on line A B of Fig. 13 with the breech-bolt in its forward but unlocked position. Fig. 7 is a section on line J K of Fig. 1$^b$. Figs. 8 and 9 are sections on line G H of Fig. 13, the breech-bolt being in its locked and unlocked positions, respectively. Figs. 10 and 12 are opposite end elevations, and Fig. 11 a top plan view, of the cartridge-feed plate. Fig. 13 is a vertical section, and Fig. 14 a side elevation, of that part of the gun shown in Figs. 1$^a$ and 2$^a$. Fig. 15 is a longitudinal section of the breech-bolt sleeve. Fig. 16 is a section thereof on line N O of Fig. 15. Fig. 17 is a section on line E F of Fig. 13. Fig. 18 is a view similar to Fig. 13, showing the breech mechanism in firing position. Fig. 19 is an under side view, partly in section, of the rear portion of the gun; and Figs. 20 to 31 are detail views of the trigger 29, tumbler 43, detent-lever 34, brake-lever 31, sear-lever 30, and shell-ejector lever 24, each of these elements being shown in elevation and plan.

The receiver, open at both ends, is indicated by the numeral 8, and has alongside of it a differential piston-cylinder 11 7, the reduced forward portion 7 of which extends some distance along the barrel 1 and constitutes the cylinder proper for the reduced forward end of a differential gas-actuated piston 19. The barrel 1 is screwed into the forward end of the casing 8, as shown in Fig. 1$^b$, said barrel having a perforated internally-threaded and laterally-projecting lug 3, against which the forward, enlarged, and internally-threaded end of the cylinder 7 abuts, and to which lug 3 said end is secured by a screw-plug 6, screwing into the lug 3 and outer end of cylinder 7, as shown in Figs. 1$^b$ and 2$^b$.

The screw-plug 6 has an axial gas-passage 6', having a lateral branch at its outer end in communication with a horizontal gas-passage $p$ leading to the bore of the barrel, said passage $p$ being tortuous in that it merges into a vertical branch $p'$ in communication with a horizontal branch $p^2$ below the bore of barrel 1, which branch $p^2$ communicates with a second vertical branch $p^3$ leading to said bore, as shown in Fig. 7, the object of this tortuous passage being to check the velocity of the flow of gas from the barrel 1 to cylinder 7, which flow of gas is controlled or may be cut off by two cone-screw valves, one 4, Fig. 1$^b$, and one 5, Figs. 2$^b$ and 7.

The differential piston comprises a tubular portion 19, open at its forward end and working in the reduced cylinder portion 7, the rear end of the piston being enlarged to fit the enlarged rear part 11 of the cylinder, said forward end of the piston being suitably packed. The piston-cylinder is closed at its rear end by a tubular cap 14, screwing into said rear end, while the rear end of the receiver is likewise closed by a tubular screw-cap 13, screwing into said rear end, as shown in Figs. 1ª and 13.

The breech-bolt-actuating sleeve 15, hereinafter referred to as the "bolt-sleeve," has a handle 17 that projects laterally through a longitudinal slot 12 in the side of the receiver 8 and contains the tubular breech-bolt 20, which latter contains the firing-pin 25, centered in the bore of the breech-bolt by a tubular centering-screw 25′, screwed into the rear end of the bolt and in which screw the firing-pin has motion.

The rear end of the firing-pin 25 is screwed into a sleeve 27, which has reduced tubular extensions 27$^b$ 27$^c$ projecting into an opening in the rear end of bolt-sleeve 15 and into the cap 13, respectively, which latter contains a buffer-spring 36 and serves to limit the rearward movement of the bolt-sleeve 15. The sleeve 27 has a handle 27$^a$, that projects through the casing-slot 12, and has a longitudinal slot in which is pivoted a locking-lever 28, Figs. 1ª and 5, whose outer end is of such width as to project sufficiently from the upper or lower face of the handle 27$^a$ as to be readily actuated by a finger to cause the inner end of the lever to engage or be disengaged from one of three recesses formed in one edge of the longitudinal slot 12 of receiver 8. In Fig. 1ª I have shown two of the recesses $a$ and $b$, respectively, the former serving to lock the firing-pin when not under the tension of its spring 25$^a$ and the latter serving to lock said pin when the spring 25$^a$ is under tension. The third recess (not shown) is located near the rear end of the receiver-slot 12 to admit of the locking of the firing-pin 25 in its rearward position.

The differential piston 19, as stated above, has its cylindrical rear end enlarged to fit the enlarged part 11 of cylinder 7, and said piston is recessed for the reception of a lug 18 on bolt-sleeve 15, which lug projects through a longitudinal slot 8′, Fig. 1ª, into the piston-cylinder, said slot 8′ being diametrically opposite the aforementioned slot 12 and, like it, extends from end to end of the receiver. In rear of said enlarged end of the piston and in said cap 14 is located the restoring-spring 35.

It is obvious that by unscrewing the caps 13 and 14 and drawing the bolt-sleeve back by means of its handle 17 the appliances in the receiver and piston-cylinder can be simultaneously withdrawn.

In opposite sides of the receiver 8 are formed guide-grooves 9, Figs. 5, 6, 17, and 18, into which project peripheral lugs 37 and 38 near the forward end of bolt-sleeve 15, Fig. 16, to guide the same toward and from the breech of the gun. The forward ends of these grooves have an upward and a downward trend, respectively, as shown in Fig. 13, and merge into recesses 9′ in front of inward projections 2, which form shoulders or abutments that serve to lock the breech-bolt 20 to the breech of the gun, said bolt having on its forward enlarged end or head peripheral lugs or projections 39 and 40, fitting the grooves 9 and guided thereby, ribs or ledges 10 10, Figs. 8, 9, and 13, being provided, which serve as bearings for said lugs 39 and 40.

The bolt-sleeve 15 has internal screw-segments 16, that fit corresponding helical grooves 21 in the breech-bolt 20, and in said helical grooves are formed lateral recesses 22, Fig. 3, forming locking-shoulders for said segments when the bolt is turned in one direction to cause said bolt to move with the sleeve, and in the head of said bolt is seated in the usual manner the shell-extractor 23.

The magazine M depends from the forward end of the receiver 8, which is open at top, and said magazine is provided with a carrier-plate 41, under the influence of a spring S, Figs. 13, 17, and 18, said carrier-plate having a seat 41$^a$ for the lowermost cartridge and a raised portion 41$^b$, Fig. 17, which latter when the magazine is empty projects into the receiver and prevents the breech-bolt from moving into its forward position, thereby indicating to the marksman that the magazine is empty, this being also indicated by the position of the handle 17 on bolt-sleeve 15, then nearly at the rear end of slot 12.

On the under side of the bolt-sleeve 15 is formed a stop-notch 34$^b$, Figs. 13 and 15, and on the under side of sleeve 27, that carries the firing-pin 25, are formed two lugs 26, Figs. 5, 6, 13, and 18, for purposes hereinafter explained.

Referring now more particularly to Figs. 13, 14, 18, 19, and 20 to 31, the receiver has on its under side four lugs $l'$ $l^2$ $l^3$ $l^4$, Figs. 13 and 18, and to a pin 32 on lug $l^2$ is fulcrumed an angle-lever 31, the shape of which is shown in Figs. 26 and 27 and which will hereinafter be referred to as the "brake-lever," the forward end of which is under the influence of a spring 31$^b$, and, as shown, the said forward end of said lever has a vertical extension 33, that projects through a slot in the receiver into the path of the bolt-sleeve 15, while the rear end of said lever 31 has downward extensions 31$^a$ connected to a head 42.

To the lug $l'$, projecting into the space between the sides or cheeks of brake-lever 31, is pivoted an angle-lever 34, (shown in detail in Figs. 24 and 25 and hereinafter referred to as the "detent-lever,") the rear end of which projects through a slot in the receiver 8 in the path of the notch 34$^b$ in bolt-sleeve 15, hereinabove referred to, while the horizontal arm 34$^a$ of said lever is under the influence of a spring $s$, which tends to hold the vertical member of the lever in the path of the aforesaid notch, while spring $31^b$ tends to maintain the vertical extension 33 or brake of lever 31 in a normal position relatively to and barely in contact with the bolt-sleeve 15.

To a pin $34^c$, at the rear end of detent-lever 34, is pivoted a tumbler 43, Figs. 22 and 23, and to the tumbler-pivot $34^c$ is pivoted the trigger 29, Figs. 20 and 21, that actuates said tumbler, which latter actuates the brake-lever. To the lug $l^3$ is pivoted the angle-lever 30, hereinafter referred to as the "sear-lever," the form of which is shown in Figs. 28 and 29 and whose side bars or cheeks converge at their front ends and have vertical hook-shaped extensions or sears $30^a$ that project through a slot in the receiver into the path of the stop-lugs 26 on the under side of the firing-pin sleeve 27, hereinabove referred to.

The side bars or cheeks of the sear-lever are slotted longitudinally, as shown at $30^c$, and into said slots project the ends of a pin $30^b$, secured in the front end of brake-lever 31. Finally, to lug $l^4$ is pivoted the ejector-lever 24, Figs. 30 and 31, whose rearwardly-inclined vertical member or nose projects also through a slot in the receiver 8 into the path of the bolt-sleeve 15 under the influence of a spring $24^a$, so that when said sleeve moves to its forward position to close the breech it will ride over the aforesaid nose of the ejector-lever and depress the same against the stress of its spring, said nose lying in line with the notch between the stop-lugs 26 on firing-pin sleeve 27, which notch is shown in Figs. 5 and 6.

In the position of the described elements shown in Fig. 13 it is presumed that the bolt-sleeve 15, breech-block 20, firing-pin 25, and piston 19 have been moved back by hand, as will be necessary before firing the first shot, whereby the restoring-spring is brought under tension, the detent-lever 34 engaging the notch $34^b$ in said sleeve 15 and locking the breech mechanism against forward motion, a cartridge being pushed into the receiver-chamber by carrier-plate 41 as soon as the breech-block 20 has moved rearward a sufficient distance to clear said chamber. At the beginning of the rearward movement of the bolt-sleeve 15 the latter moves independently of the breech-bolt and imparts to it a partial rotation to unlock it, as hereinafter described, and at the same time compresses the firing-pin-actuating spring 25 between the tubular screw 25' in the breech-bolt and an enlargement near the forward end of the firing-pin. If the trigger 29 is now pulled back, the following will take place: During the first part of the movement of the trigger and before the tumbler 43 acts upon the head 42 of the brake-lever 31 said trigger will first tilt the detent-lever 34, thereby releasing the bolt-sleeve 15, which is rapidly driven forward by the restoring-spring 35 acting on piston 19, and the cartridge in the receiver is driven into the breech of the gun by the breech-bolt 20. Before the bolt-sleeve 15 and breech-bolt 20 have completed their forward movement the sear-hooks $30^a$ on lever 30 will engage the lugs 26 on firing-pin-sleeve 27 and hold the same against further movement with the bolt-sleeve 15, and, as above stated, the ejector lever 24 is depressed against the stress of its spring $24^a$ by said forward movement of the bolt-sleeve, and as said bolt-sleeve completes its forward movement the bolt is locked to the breech, the parts being now in their relative positions shown in Fig. 18, the extractor engaging the rim or flange of the cartridge in the breech. The pull on the trigger 29 applies the brake 33 on the brake-lever 31 to the bolt-sleeve 15, so that its rapid forward movement under the stress of the restoring-spring 35 can be checked sufficiently to insure the engagement of the sear-hooks $30^a$ on sear-lever 30 with the lugs 26 on the sleeve 27 of the firing-pin 25, whereby liability of breakage of the engaging parts, particularly of the sears $30^a$, is avoided, and, as will be readily understood, this forward movement of the carrier may be entirely checked by said brake 33 if sufficient power is applied to the trigger 29. As soon as the bolt-sleeve 15 clears the brake 33 the brake-lever is free to move, and a continued pull on the trigger 29 will cause the tumbler 43 to act on the head 42 of said lever, thereby depressing its rear end and raising its forward end against the stress of its spring $31^b$ and through the pin $30^b$ acting on the rear end of the sear-lever 30 raises said rear end and depresses its forward end to move the sears $30^a$ out of engagement with the lugs 26 on the sleeve 27 of the firing-pin 25, releasing the latter, which is driven forward under the stress of its spring $25^a$ and explodes the cartridge, while said continued pull on the trigger 29 causes the tumbler 43 to slide off head 42 of brake-lever 31. As the cartridge is exploded the gases of explosion acting on the piston 19 will drive the same and the bolt-sleeve 15 rearward, thereby placing the restoring-spring under tension, the shock of which movement is taken up partly by said restoring-spring and partly by the buffer-spring 36.

It has been stated that the piston is a tubular one and open at its forward end. The object of this is to minimize the recoil of the piston, the gases acting thereon by expansion, as will be readily understood.

As the brake-lever 31 is released simultaneously with the release of the firing-pin said lever will at once resume its normal position under the action of its spring $31^b$, thereby withdrawing the brake 33 into its normal position and returning the sear-lever 30 to its normal position as the bolt-sleeve 15 is being driven rearwardly by the gases of explosion, the lugs on the sleeve 27 of the firing-pin having rear inclined faces, Figs 13 and 18, which slide over the forward rounded faces of the sears 30ª. At the same time the ejector 24 is moved into line with the notch between said lugs 26 into the path of the shell extracted by the extractor 23 and ejects the same from the receiver, which is open at top, in a well-known manner.

It will be readily seen that so long as the trigger 29 is held back the spring s of the detent-lever 34 cannot return the latter, the tumbler 43, and the trigger itself into their normal positions, and as it is quite impossible to release the trigger before the bolt-sleeve 15 is again driven forward by the restoring-spring, owing to the rapidity with which said sleeve is driven rearwardly by the gases of explosion, the detent 34 will not be in position to lock the bolt-sleeve 15 against forward movement, so that the breech mechanism under the respective action of the gases of explosion and the restoring-spring will be driven rearward and then immediately forward into the position, Fig. 18, by the time the detent 34, the tumbler 43, and trigger 29 have again assumed their normal positions, Fig. 18, the gun being ready for firing.

Of course it will be understood that at each forward movement of the breech-bolt and its sleeve 15 with the piston 19 the gas in the cylinder part 7 will be driven out of said part into the barrel 1 before the next cartridge can be exploded, so that the admission-passage performs also the function of exhaust-passage, whereby the provision of a separate exhaust-port, as is commonly the case, is avoided.

From the description of the construction and operation of the gun its operation by hand through the medium of the handle 17 will be readily understood, and in this operation the communication between the barrel 1 and cylinder 7 will of course be cut off by means of the screw-valve 5 or both screw-valves 4 and 5.

The unlocking and locking of the breech-bolt is effected as follows: By the rearward movement of the bolt-sleeve 15 the firing-pin-actuating spring 25ª is brought under tension, as above stated, while the breech-bolt is rotated sufficiently by the screw-segments 16 on the sleeve 15 traveling along the spiral grooves 21 in bolt 20 to bring the locking-lugs 39 and 40 of said bolt in line with the forward ends of guide-grooves 9, said lugs bearing on ribs 10, Fig. 8. As the lugs 39 and 40 travel along the inclined front ends of grooves 9 the breech-bolt is further rotated, whereby the screw-segments 16 will enter the aforesaid recesses 22, and thereby lock the bolt to its sleeve 15, both moving back, and with them the firing-pin, to the position shown in Figs. 1ª and 13. The locking of the breech-bolt 20 to the breech takes place in reverse order—that is to say, as the lugs 39 40 travel along the inclined front ends of grooves 9 the bolt is turned in a direction opposite to that above described, so that the screw-segments 16 on the bolt-sleeve 15 will now lie in groove 21, thereby disengaging the bolt from said sleeve, at which time said lugs 39 40 will have cleared grooves 9, when the sleeve completing its forward movement turns the bolt with its lugs 39 40 onto the ribs 10 10, Fig. 9, and into engagement with the locking-shoulders 2 2.

It has hereinbefore been stated that when the last cartridge has been fired the part 41ᵇ of the carrier-plate 41 will project into the receiver and path of the breech-bolt 20, thus preventing its forward motion. When in this position and in view of brake-arm 33 contacting with the bolt-sleeve 15, but a slight backward movement can be imparted to the trigger 29—namely, to such an extent as would in operation disengage the detent-lever 34 from carrier-notch 34ᵇ or until the tumbler 43 comes in contact with lever 31, as will readily be seen—and this limited movement of the trigger will also indicate to the marksman that the magazine is empty.

The strong closing-caps 13 and 14, with their equally strong screw-threads, preclude all danger of the bolt-sleeve 15 and piston 19 breaking said caps or shearing their threads and flying out rearwardly, and, as hereinbefore stated, the only means for removing the breech mechanism and piston is through the rear end of the receiver 8, so that the latter can be built as strongly as desired. On the other hand, the gun presents another very great advantage in that the breech-bolt 20 cannot be unlocked before the projectile has left the gun, which is of great importance to an accurate aim. This result is due to the combination of the very narrow and tortuous channel $p$ $p'$ $p^2$ $p^3$, which connects cylinder 7 with the barrel 1, the means for accurately controlling the volume of gases to said cylinder—namely, the screw-valves 4 and 5—and the tubular piston 19, so that the gases of explosion before acting on the piston must fill the same, during which time the pressure on the breech-bolt and its locking-surfaces is such as to prevent any rotary movement of said bolt until the projectile has left the barrel and the bolt is relieved of pressure, when the gases will drive the sleeve 15 back, the exhaust of the gases back into the barrel through the channel referred to taking place comparatively slowly, so that by these means a too violent backward movement of the sleeve 15 and parts connected therewith is also avoided.

Having thus described my invention, what I claim as new therein, and desire to secure by Letters Patent, is—

1. The receiver open at its rear end and provided with longitudinal slots in its opposite side walls extending substantially from end to end thereof, the barrel secured to the receiver, a piston-cylinder alongside thereof and removable caps closing the ends of said cylinder and receiver respectively and forming-chambers for restoring and buffer springs.

2. The combination with the barrel, the receiver open at its rear end, a removable cap to close said end, the breech-bolt and its sleeve movable longitudinally in said receiver to open and close the breech; of a piston-cylinder arranged along one side of the receiver and open at its rear end, the forward end of said cylinder in communication with the barrel, a piston in said cylinder connected to the breech-bolt sleeve, a restoring-spring acting on the rear end of said piston and a removable cap to close the rear end of said cylinder, for the purpose set forth.

3. The combination with the barrel, the receiver open at its rear end, a removable cap to close said end, the breech-bolt and its sleeve movable longitudinally in said receiver to open and close the breech, and a buffer-spring in rear of said sleeve; of a piston-cylinder arranged along one side of the receiver and open at its rear end, the forward end of said cylinder in communication with the barrel, a piston in said cylinder connected to the bolt-sleeve, a restoring-spring acting on the rear end of said piston and a removable cap to close the rear end of said cylinder, for the purposes set forth.

4. The combination with the barrel, the receiver open at its rear end, a removable cap to close said end, the breech-bolt and its sleeve movable longitudinally in said receiver to open and close the breech; of a piston-cylinder arranged along one side of the receiver and open at its rear end, the forward end of said cylinder in communication with the barrel, a piston in said cylinder detachably connected to the breech-bolt sleeve, a restoring-spring acting on the rear end of the piston and a removable cap to close the rear end of the cylinder, for the purpose set forth.

5. The combination with the barrel, receiver and breech mechanism; of a piston-cylinder in communication with said barrel at a point forward of the breech, a piston connected with said breech mechanism said piston being hollow and open at its forward end, whereby the action of the gases of explosion is delayed until the hollow piston is filled.

6. The combination with the barrel, the receiver, the breech-bolt and its sleeve; of a piston-cylinder on one side of the receiver and extending along the barrel to a point forward of the breech, a communication between said barrel and forward end of the cylinder, and a hollow piston open at its forward end and connected to the bolt-sleeve whereby the action of the gases of explosion is delayed until the hollow piston is filled.

7. The combination with the barrel, the receiver, the breech-bolt and its sleeve; of a piston-cylinder on one side of the receiver and extending along the barrel to a point forward of the breech, a gas-passage of alternate opposite direction leading from the barrel to the forward end of the cylinder, and a hollow piston connected to the bolt-sleeve and open at its forward end to retard the flow of the gases of explosion to the cylinder and cause them to act expansively on the piston.

8. The combination with the barrel, the receiver, the breech-bolt and its sleeve; of a piston-cylinder on one side of the receiver and extending along the barrel to a point forward of the breech, a gas-passage of alternate opposite direction leading from the barrel to the forward end of the cylinder to more or less check the flow of gases thereto, said gas-passage also serving as exhaust-passage, and a hollow piston connected to the bolt-sleeve and open at its forward end to delay the action of the gases of explosion on the piston and to prevent the opening of the breech until the projectile has left the barrel.

9. The combination with the barrel provided forward of the breech with a laterally-projecting lug having a screw-threaded bore, the receiver, the breech-bolt and its sleeve movable longitudinally in said receiver to open and close the breech; of a piston-cylinder arranged along one side of the receiver with its outer open end abutting against the rear face of the aforesaid lug on the barrel, a screw-plug having an axial passage, screwing into said lug and into the forward end of the cylinder, said axial passage of the screw-plug in communication with the bore of the barrel through a passage in the lug, and a regulating and cut-off valve screwing into the forward end of the aforesaid screw-plug, a piston in said cylinder connected to the breech-bolt sleeve and a restoring-spring acting on the rear end of said piston.

10. The combination with the barrel, the receiver, the breech-bolt and its actuating-sleeve; of a cylinder on one side of said receiver extending along the barrel to a point forward of the breech, a piston connected to the bolt-sleeve, said piston hollow and open at its forward end and said forward end of the cylinder in communication with the barrel and a cut-off in said communication, substantially as and for the purpose set forth.

11. The combination with the barrel provided forward of the breech with a laterally-projecting lug having a screw-threaded bore, the receiver, the breech-bolt and its sleeve movable longitudinally in said receiver to open and close the breech; of a piston-cylinder arranged along one side of the receiver with its outer open end abutting against the rear face of the aforesaid lug on the barrel, a screw-plug, having an axial passage, screwing into said lug and into the forward end of the cylinder, said axial passage of the screw-plug in communication with the bore of the barrel through the tortuous passage $p, p', p^2, p^3$, the screw-valve 4 in the outer end of said plug, the screw-valve 5 controlling the vertical branch $p'$ of the aforesaid passage, a piston in said cylinder and a restoring-spring acting on the rear end of the said piston, for the purposes set forth.

12. The combination with the barrel provided forward of the breech with a laterally-projecting lug having a screw-threaded bore, the receiver, the breech-bolt and its sleeve movable longitudinally in said receiver to open and close the breech; of a piston-cylinder arranged along one side of the receiver with its outer open end abutting against the rear face of the aforesaid lug on the barrel, a screw-plug having an axial passage screwing into said lug and into the forward end of the cylinder, said axial passage of the screw-plug in communication with the bore of the barrel through the tortuous passage $p, p', p^2, p^3$, the screw-valve 4 in the outer end of said plug, the screw-valve 5 controlling the vertical branch $p'$ of the aforesaid passage, a tubular piston open at its forward end contained in the cylinder and connected to the bolt-sleeve, and a restoring-spring acting on the rear end of said piston, for the purposes set forth.

13. The combination with the barrel, the receiver open at its rear end and provided with longitudinal slots in opposite side walls extending substantially the full length thereof, the breech-bolt, the spring-actuated firing-pin therein and the bolt-sleeve adapted to move rearwardly independently of the bolt and thereby unlock the same and simultaneously compress the firing-pin-actuating spring, said sleeve provided with a handle projecting through one of the aforesaid receiver-slots and with a lug projecting through the other slot, a removable cap closing the rear end of the receiver and a buffer-spring in said cap; of a piston-cylinder on one side of the receiver open at its rear end and extending along the barrel to a point forward of the breech and communicating with said barrel, a piston recessed to engage the aforesaid lug on the bolt-sleeve, a removable cap closing said rear end of said cylinder and a restoring-spring in said cap, substantially as and for the purpose set forth.

14. In a breech-loading gun, the combination with the breech-closing mechanism, its actuating-spring and the firing mechanism; of a brake operated by the trigger of said firing mechanism and acting on the breech-closing mechanism, for the purpose set forth.

15. In a gas-actuated gun, the barrel, the receiver open at its rear end and having along one side a longitudinal slot also open at its rear end, said receiver having along its opposite side a housing and a cylinder, the forward end of the latter in communication with the bore of the barrel, said housing open at its rear end, caps closing the rear ends of the receiver and housing, and restoring and buffer springs in said rear end of the housing and receiver respectively; of a gas-actuated piston working in the aforesaid housing and cylinder, and a breech-closing mechanism in positive engagement with said piston, said mechanism provided with a handle projecting through the aforesaid slot in the receiver, for the purposes set forth.

16. In a breech-loading gun, the combination with the receiver provided along one side with a slot 12 having recesses or notches $a, b$ in one of its walls and a like recess near its rear end, the breech-bolt and its sleeve, and the firing-pin arranged concentrically, said firing-pin projecting through the rear end of the sleeve and having secured thereto a handle projecting through the aforesaid slot 12; of the safety locking-lever 28 pivoted in a slot of said handle and adapted to engage the aforesaid recesses or notches, for the purpose set forth.

17. In a breech-loading gun, the combination with the breech-bolt sleeve having the stop-notch $34^b$, the breech-bolt, the firing-pin provided with a stop-lug 26, the firing-pin-actuating spring and means to move said sleeve toward and from the breech of the gun; of a detent-lever adapted to engage notch $34^b$, a sear adapted to engage lug 26 as the breech-bolt closes the breech by the forward movement of the sleeve, a brake adapted to act on the sleeve, means to return said lever, sear and brake into normal position, and a trigger to operate said parts, for the purpose set forth.

18. In a breech-loading gun, the combination with the breech-bolt sleeve having the stop-notch $34^b$, the breech-bolt, the firing-pin having the stop-lug 26, the firing-pin-actuating spring and means to move said sleeve toward and from the breech of the gun; of a detent-lever and a sear adapted to engage the aforesaid notch and lug, respectively, a brake normally acting on the sleeve, a trigger, means controlled thereby to first move the detent-lever, then the brake and then the sear out of engagement with the sleeve and firing-pin, and means preventing the disengagement of the brake until the sleeve has completed its forward movement and cleared the brake, substantially as and for the purposes set forth.

19. In a breech-loading gun, the combination with the breech-bolt sleeve having stop-notch $34^b$, the breech-bolt, the firing-pin having stop-lug 26, the firing-pin-actuating spring and means to move the bolt-sleeve toward and from the breech; of a detent and a sear respectively adapted to engage the aforesaid notch and lug, a brake-lever, a trigger and a tumbler, said trigger operating to disengage the detent from the bolt-sleeve notch and operating said tumbler and through the latter the brake-lever to maintain it in contact with the sleeve until it has cleared said lever and to then tilt the latter and thereby move the sear out of engagement with the lug on the firing-pin, for the purposes set forth.

20. In a breech-loading gun, the combination with the breech-bolt sleeve, the breech-bolt, the firing-pin having a stop-lug 26, the firing-pin-actuating spring and means to move the sleeve toward and from the breech of the gun; of a sear adapted to engage lug 26 as the breech-bolt closes the breech during the forward motion of the sleeve, a trigger, means operated thereby to disengage the sear from said lug, and a brake controlled by the sleeve to prevent such disengagement until said sleeve has cleared the brake, for the purpose set forth.

21. In a breech-loading gun, the combination with the breech-bolt sleeve, the breech-bolt, the firing-pin provided with bifurcated stop-lug 26, the firing-pin-actuating spring and means to move the sleeve toward and from the breech; of a bifurcated sear-lever in the path of the aforesaid stop-lug, a spring-actuated ejector pivoted in the bifurcation of the sear-lever at the rear end of the receiver, a brake-lever acting on the bolt-sleeve and pivotally connected to the sear-lever, a trigger and a tumbler operated thereby and acting on the brake-lever to hold it in contact with said sleeve until the latter has completed its forward movement and cleared the brake and then tilt the brake-lever and therethrough the sear-lever to disengage the sear from lug 26, for the purpose set forth.

In testimony whereof I have signed my name to this specification in the presence of two subscribing witnesses.

HANS STAMM.

Witnesses:
MORITZ VEITH,
A. LIEBERKNECHT.